(12) United States Patent
Huang

(10) Patent No.: US 11,683,095 B1
(45) Date of Patent: Jun. 20, 2023

(54) BOX-TYPE PACKAGED OPTICAL TRANSCEIVER

(71) Applicant: SHUNYUN TECHNOLOGY (ZHONG SHAN) LIMITED, Zhongshan (CN)

(72) Inventor: Jie Huang, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 0 days.

(21) Appl. No.: 17/694,853

(22) Filed: Mar. 15, 2022

(30) Foreign Application Priority Data

Feb. 25, 2022 (CN) .......................... 202210176503.9

(51) Int. Cl.
*H04B 10/40* (2013.01)
(52) U.S. Cl.
CPC ................................... *H04B 10/40* (2013.01)
(58) Field of Classification Search
CPC ..................................................... H04B 10/40
USPC ........................................................ 398/139
See application file for complete search history.

(56) References Cited

U.S. PATENT DOCUMENTS

| | | | |
|---|---|---|---|
| 10,989,870 B2 * | 4/2021 | Lin | H04B 10/503 |
| 2005/0213984 A1 * | 9/2005 | Liu | H04B 10/40 |
| | | | 398/139 |
| 2020/0328814 A1 * | 10/2020 | Luo | H04J 14/02 |

FOREIGN PATENT DOCUMENTS

| | | | |
|---|---|---|---|
| CN | 202735549 U | 2/2013 | |
| CN | 104459904 A | 3/2015 | |
| CN | 104678515 A | 6/2015 | |
| CN | 108732684 A | 11/2018 | |
| CN | 108957649 A | 12/2018 | |
| CN | 109100838 A | 12/2018 | |
| CN | 110417476 A | 11/2019 | |
| CN | 112180521 A * | 1/2021 | ........... G02B 6/2938 |
| CN | 112558238 A | 3/2021 | |
| TW | M406322 | 6/2011 | |
| WO | 2018170828 A1 | 9/2018 | |

* cited by examiner

*Primary Examiner* — Dalzid E Singh
(74) *Attorney, Agent, or Firm* — ScienBiziP, P.C.

(57) ABSTRACT

A box-type packaged optical transceiver with multiplexing capabilities includes a box-shaped housing, a cover plate, an optical receiving module, an optical emitting module, a prism module, and an optical fiber connector. The housing has a through hole and is hermetically sealed by the cover plate. The optical receiving module, the optical emitting module and the prism module are disposed in the internal space. A first incoming optical signal is transmitted to the optical receiving module through the optical fiber connector, the through hole, and the prism module, and the optical emitting module emits an outgoing second optical signal through the prism module, the through hole, and the optical fiber connector.

16 Claims, 4 Drawing Sheets

BOX-TYPE PACKAGED OPTICAL TRANSCEIVER

FIELD

The subject matter herein generally relates to box-type packaged optical transceivers.

BACKGROUND

Optical communications have low transmission loss, high data confidentiality, immunity from EMI, and large bandwidth. Optical transceivers, which convert optical signals into electrical signals for transmission, and convert electrical signals into optical signals for transmission through an optical fiber network, are important basic components for optical communication.

However, conventional box-type packaged optical components only have a single transmit channel or receive channel. Each optical component needs to be mounted individually on electrical elements, with gold wire bonding, hermetic sealing, and optically coupling, which limits the amount of optical transmission and increases the complexity of assembly process, affecting the yield of products.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
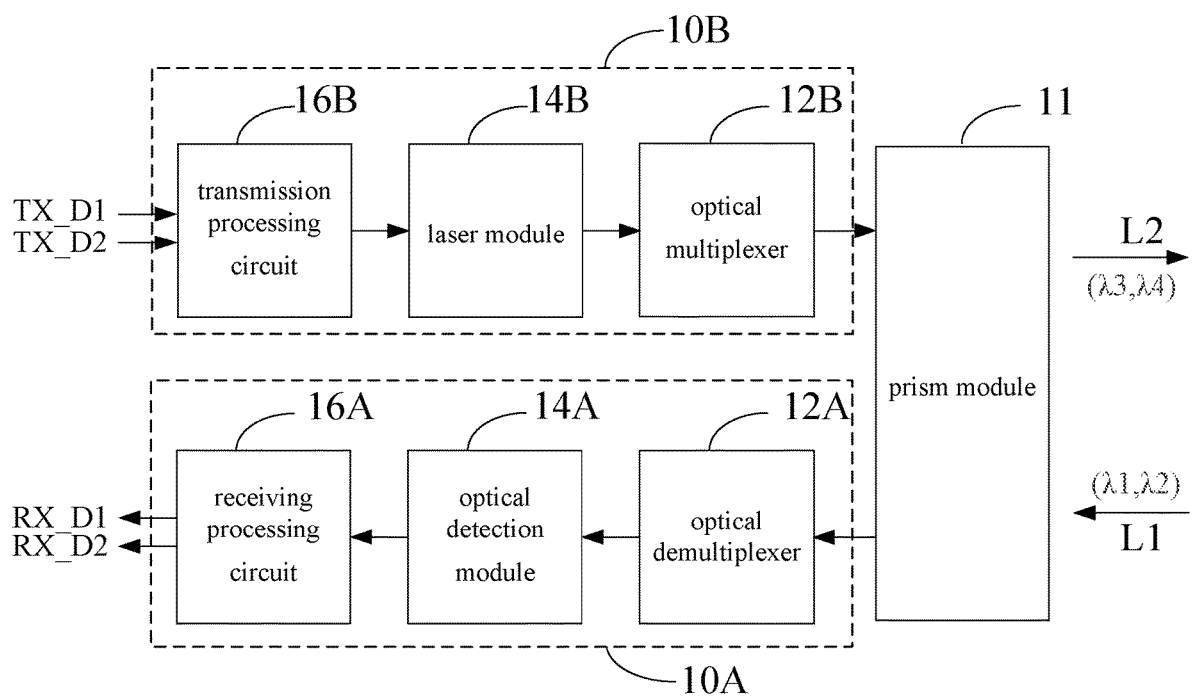
FIG. 1 is a schematic block diagram of an optical transceiver device according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 shows an optical transceiver device (optical transceiver device 100) according to an embodiment of the disclosure. As shown in FIG. 1, the optical transceiver device 100 comprises an optical receiving module 10A, an optical emitting module 10B, and a prism module 11. The optical receiving module 10A comprises an optical demultiplexer 12A, an optical detection module 14A and a receiving processing circuit 16A. The optical emitting module 10B comprises an optical multiplexer 12B, a laser module 14B, and a transmission processing circuit 16B. In this embodiment, the optical transceiver device 100 is coupled to an optical fiber cable through an optical fiber connector (not shown). The optical fiber connector can be a straight tip (ST) type, square connector (SC) type, ferrule connector (FC) type, and little connector (LC) type.

Dense wavelength division multiplexing (DWDM) is a fiber-optic transmission technique. It multiplexes many different wavelength signals onto a single optical fiber. Each optical fiber has a set of parallel optical channels and each one uses slightly different light wavelength. The optical fibers employ certain light wavelengths to transmit data parallel-by-bit or serial-by-character. An embodiment of the disclosure involves the DWDM technology. The optical transceiver device 100 can receive or transmit optical signals in different wavelengths. Therefore, the optical signal L1 received by the optical fiber connector can have two wavelengths such as $\lambda 1$ and $\lambda 2$, and the transmitted optical signal L2 can have two wavelengths such as $\lambda 3$ and $\lambda 4$. The numbers of the laser diodes of the laser module 14B and that of the optical detectors of the optical detection module 14A are also arranged to correspond to the number of channels. Although the embodiment uses a two-channel configuration as an example, the actual number is not limited to these, and there may be 4, 8, 16, 32, etc. channels.

The prism module 11 can transmit optical signals with wavelengths within a specific range and reflect optical signals with wavelengths within another specific range. The optical signal L1 is transmitted to the optical demultiplexer 12A through the prism module 11. According to an embodiment of the disclosure, the optical demultiplexer 12A uses an Arrayed Waveguide Grating (AWG) technology to differentiate the optical signal L1 into optical signals corresponding to two wavelengths $\lambda 1$ and $\lambda 2$. The optical detection module 14A detects optical signals and generates corresponding electrical signals. According to an embodiment of the disclosure, the optical detection module 14A may include P-doped-intrinsic-doped-N (PIN) diodes or avalanche photodiodes (APD). The electrical signals are processed by the amplifying circuit (such as a trans-impedance amplifier (TIA)) and the conversion circuit of the receiving processing circuit 16A, and then the data (RX_D1, RX_D2) transmitted by the optical signal L1 can be obtained. According to other embodiments of the disclosure, the optical demultiplexer 12A may also use related technologies such as a thin-film filter (TFF) or a Fiber Bragg Grating (FBG) to convert the optical signal L1 into different wavelengths of light.

The transmission processing circuit 16B receives and converts the electrical data signals (TX_D1, TX_D2), and outputs the converted signals to the laser module 14B. The laser module 14B modulates the received electrical data signals into optical signals. In the embodiment of the disclosure, the laser module 14B can be one or more Vertical-Cavity Surface-Emitting laser diodes (hereinafter referred to as VCSELs). The VCSELs form an array to emit optical signals. In other embodiments, the laser module 14B can be light-emitting diodes (LED), edge emitting laser diodes (EELD), distributed feedback laser diodes (DFB), or electro-absorption modulated laser diodes (EML).

The optical multiplexer 12B converts the modulated optical signal corresponding to the electrical data signals (TX_D1, TX_D2) into an optical signal L2 including two wavelengths of λ1 and λ2, and transmits the optical signal L2 to the optical fiber connector through the prism module 11. According to an embodiment of the disclosure, the optical receiving module 10A and the optical emitting module 10B further include other functional circuit elements, such as a laser driver and an automatic power controller (APC) for driving the laser module 14B, a monitor photodiode (MPD) to monitor the power of the laser module 14B, circuit elements necessary to implement the optical signal transmission, and the digital signal processing integrated circuit for processing the electrical signals from the optical receiving module 10A. Those to be transmitted to the optical emitting module 10B are well known to those skilled in the art, and will not be repeated here.

Figure 2:
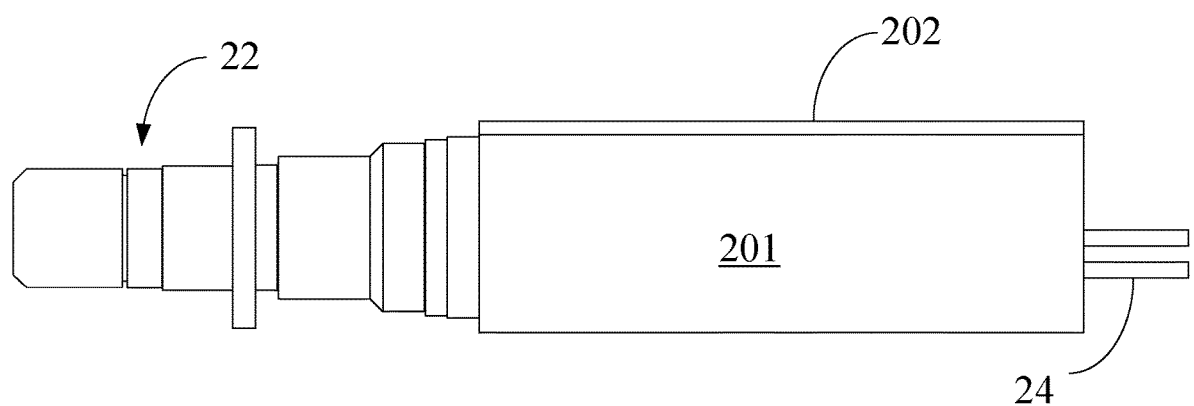
FIG. 2 is a side view of a box-type packaged optical transceiver according to an embodiment of the disclosure.

FIG. 2 shows a side view of a box-type packaged optical transceiver according to an embodiment of the disclosure. The box-shaped packaged optical transceiver according to an embodiment of the disclosure comprises a box-shaped housing 201, a cover plate 202, an optical fiber connector 22, and electrical connection elements 24. The box-shaped housing 201 is a housing with five fixed surfaces and the removable cover plate 202 forms the sixth surface. By assembling the cover plate 202 to the box-shaped housing 201, a hermetically sealed container is formed. The inner space formed by the box-shaped housing 201 and the cover plate 202 is used for arranging electrical elements. The box-shaped housing 201 and the cover plate 202 can be made of metal. According to an embodiment of the disclosure, the material of the box-shaped housing 201 and the cover plate 202 is Kovar alloy.

For the convenience of description, the disclosure takes the box-shaped housing 201 as a rectangular parallelepiped as an example. The specific shape of the box-shaped housing 201 is not limited. Those skilled in the art can select a box-shaped housing with a specific shape as required. In addition, the disclosure stipulates that the box-shaped housing 201 is hermetically sealed by the cover plate 202, surfaces within the sealed space are defined as inner or interior surfaces, and the surfaces that can be seen from the outside are defined as outer or exterior surfaces. The side opposite to the cover plate 202 is defined as the bottom surface, the cover plate 202 is defined as the top surface, and the four surfaces surrounding the bottom surface are defined as the side surfaces.

There is a through hole for optical signals to pass the optical fiber connector 22 on one side of the box-shaped housing 201. According to an embodiment of the disclosure, the optical fiber connector can be in the form of straight tip (ST) type, square connector (SC) type, ferrule connector (FC) type, and little connector (LC) type. On the other side of the box-shaped housing 201 opposite to the optical fiber connector 22, there are electrical connection elements 24. The electrical connection elements 24 pass through one of the sides and are electrically connected to the components in the internal space formed by the box-shaped housing 201 and the cover plate 202. In FIG. 2, the electrical connection elements 24 are shown in the form of pins, however, the form of the electrical connection elements 24 is not limited to this. Those skilled in the art can select a specific form of the electrical connection elements 24 as needed. For example, the electrical connection elements 24 can be printed on a printed circuit board which passes through the side surface, or can be electrically connected to an external flexible printed circuit board (FPC) through pins. In addition, in this embodiment, the electrical connection elements 24 are arranged in two rows, and in other embodiments, they can also be arranged in a circle, so as to obtain better RF performance in high frequency ranges.

Figure 3:
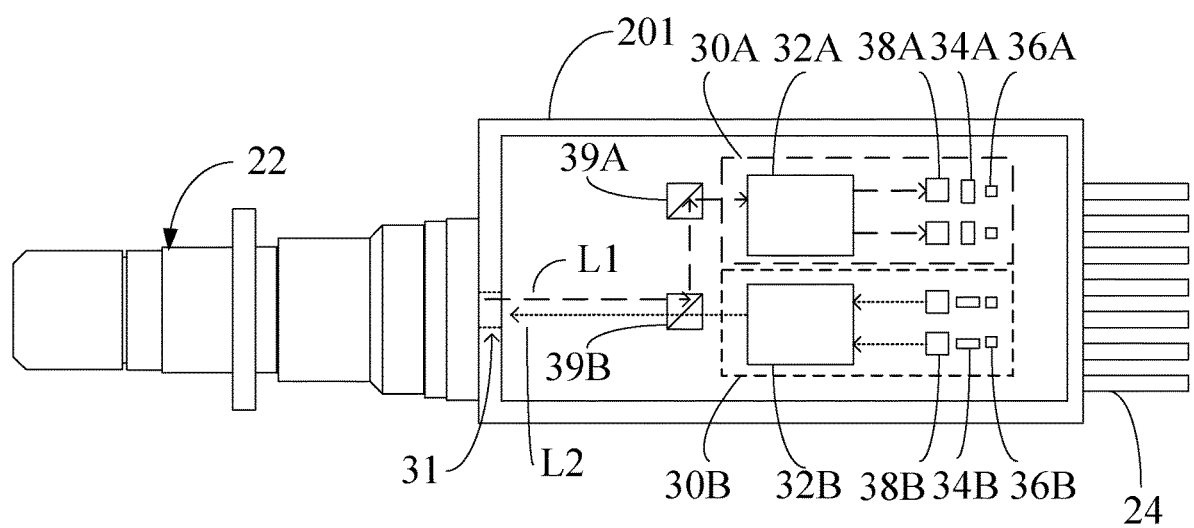
FIG. 3 is a top view of a box-type packaged optical transceiver according to an embodiment of the disclosure.

FIG. 3 shows a top view of a box-type packaged optical transceiver according to an embodiment of the disclosure. For the convenience of description, FIG. 3 does not show the cover plate 202, labels of optical paths are added. A through hole 31 is provided on the side of the box-shaped housing 201 that is connected to the optical fiber connector 22 for allowing optical signals to pass through. The optical receiving module 30A comprises an optical multiplexer 32A, optical detectors 34A, receiving processing circuits 36A, and lenses 38A. According to an embodiment of the disclosure, optical components such as the optical multiplexer 32A, the optical detectors 34A, the lenses 38A, and the prism unit 39A are directly mounted on the inner surface of the box-shaped housing 201, and are connected with components by gold wire bonding. The optical signal L1 passing through the optical fiber connector 22 and the through hole 31 comprises two wavelengths of light, that is, 1311 nm and 1331 nm.

The prism units 39A and 39B can transmit optical signals with wavelengths within a specific range and reflect optical signals with wavelengths of another specific range. According to an embodiment of the disclosure, the prism units 39A and 39B can reflect optical signals with wavelengths of 1311 nm and 1331 nm, so that the optical signal L1 enters the optical demultiplexer 32A by the reflection of prism units 39A and 39B. The optical demultiplexer 32A uses an Arrayed Waveguide Grating (AWG) technology to differentiate the optical signal L1 into light signals corresponding to the wavelengths of 1311 nm and 1331 nm. The light signals output by the optical demultiplexer 32A are adjusted into parallel light by the lenses 38A, and then are projected to the optical detectors 34A. The two optical detectors 34A respectively detect the optical signals with wavelengths of 1311 nm and 1331 nm, and generate corresponding electrical signals. According to an embodiment of the disclosure, the optical detectors may include P-doped-intrinsic-doped-N (PIN) diodes or avalanche photodiodes (APD). The electrical signals are processed by the amplifying circuit (such as a trans-impedance amplifier (TIA)) and the conversion circuit of the receiving processing circuit 36A, and then the data transmitted by the optical signal L1 can be obtained.

The optical emitting module 30B comprises an optical multiplexer 32B, laser diodes 34B, transmission processing circuits 36B, and lenses 38B. According to an embodiment, optical components such as the optical multiplexer 32B, the laser diodes 34B, the lenses 38B, and the prism unit 39B are directly mounted on the inner surface of the box-shaped housing 201, and are connected with components by gold wire bonding. The transmission processing circuits 36B convert and transmit the received electrical data signals to the laser diodes 34B, and the laser diodes 34B modulate the received electrical data signals into optical signals. In the embodiment of the disclosure, the laser diodes 34B can be VCSELs, light-emitting diodes (LED), edge emitting laser diodes (EELD), distributed feedback laser diodes (DFB) or electro-absorption modulated laser diodes (EML).

According to an embodiment of the disclosure, the wavelengths of the light emitted by the laser diodes 34B as signals are 1271 nm and 1291 nm. The light signals output by the laser diodes 34B are adjusted into parallel light by the lenses 38B and then are projected to the optical multiplexer 32B. The optical multiplexer 32B converts the two light signals into an optical signal L2 including two wavelengths of 1271 nm and 1291 nm. Since the prism unit 39B allows the optical signals in this direction and the above wavelengths to pass, the optical signal L2 passes through the prism unit 39B and the through hole 31, to the optical fiber connector 22, for outputting to the optical cable.

According to an embodiment of the disclosure, the centers of the optical fiber connector 22, the prism unit 39B, and the through hole 31 are collinear, the prism units 39A and 39B are collinear, and an extension line formed by the prism units 39A and 39B is orthogonal to that formed by the centers of the optical fiber connector 22, the prism unit 39B, and the through hole 31. According to the embodiment of the disclosure, the optical receiving module 30A and the optical emitting module 30B further include other functional circuit elements, such as a laser driver and an automatic power controller (APC) for driving the laser diodes 34B, a monitor photodiode (MPD) to monitor the power of the laser diodes 34B, circuit elements necessary to implement the optical signal transmission, and the digital signal processing integrated circuit for processing the electrical signals from the optical receiving module 30A and similarly for those to be transmitted to the optical emitting module 30B, well known to those skilled in the art.

Figure 4:
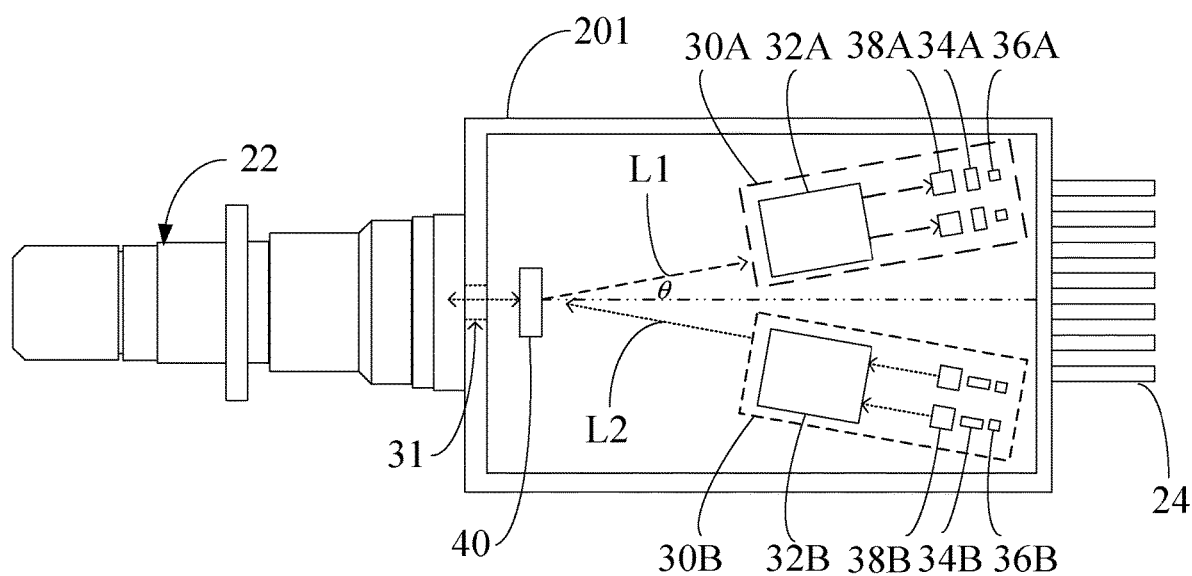
FIG. 4 is a top view of a box-type packaged optical transceiver according to another embodiment of the disclosure.

FIG. 4 is a top view of a box-type packaged optical transceiver according to another embodiment of the disclosure. The difference between the embodiment shown in FIG. 4 and that shown in FIG. 3 is that the prism units 39A and 39B are replaced by a single prism unit 40, and the axial directions of the optical receiving module 30A and the optical emitting module 30B intersects with the extension line formed by the centers of the optical fiber connector 22, the through hole 31, and the prism unit 40 and have an included angle θ. In FIG. 4, the optical receiving module 30A and the optical emitting module 30B are located on each side of the extension line formed by the prism module and the through hole.

According to the embodiment of the disclosure, the included angle θ is an acute angle, and the angle may be in the range of 1-15 degrees. The prism unit 40 deflects the incident light signal with wavelengths of 1311 nm and 1331 nm by an angle θ counterclockwise, so that the deflected optical signal L1 is transmitted in a first direction, and is able to enter the optical demultiplexer 32A directly. The first direction intersects an extension line formed by the optical fiber connector 22 and the through hole 31. The optical emitting module 30B also rotates by the angle θ, so that the optical signal L1 can be transmitted in the manner described in FIG. 3.

Similarly, the prism unit 40 can deflect the incident optical signal L2 with wavelengths of 1271 nm and 1291 nm by the angle θ counterclockwise. The optical emitting module 30B emits the optical signal L2 in a second direction, and the second direction intersects with the extension line formed by the optical fiber connector 22 and the through hole 31. In addition, there is an included angle θ between the axis direction of the optical emitting module 30B and the extension line formed by the centers of the optical fiber connector 22, the through hole 31, and the prism unit 40. Thus, the deflected optical signal L2 output by the optical multiplexer 32B is aligned with the centers of the optical fiber connector 22 and the through hole 31, and is transmitted to the optical fiber connector directly. The structure and function of the prism unit 40 are well known to those skilled in the art. The connections and functions of other elements in the embodiment shown in FIG. 4 are the same as those in FIG. 3, and are not repeated here.

According to the box-type packaged optical transceiver provided by the embodiment of the disclosure, the laser diodes and optical detectors of different wavelengths, the optical multiplexer, and the optical demultiplexer are integrated in a single box-type package. Compared with conventional box-type packaged optical components, which only have a single transmission channel or single receiving channel, the components of the box-type package can be effectively reduced, and the number of times of hermetic packaging and optical coupling is reduced, decreasing the complexity of the assembly process and improving the product yield.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A box-type packaged optical transceiver comprising:
a box-shaped housing having a through hole;
a cover plate coupled with the box-shaped housing, and forming an internal space with the box-shaped housing;
an optical receiving module disposed in the internal space;
an optical emitting module disposed in the internal space;
a single prism unit disposed in the internal space;
an optical fiber connector connected to the through hole; and
an electrical connection element passes through the box-shaped housing and electrically connected to the optical receiving module and the optical emitting module,
wherein a first optical signal is transmitted to the optical receiving module through the optical fiber connector, the through hole and the single prism unit, and the optical emitting module emits a second optical signal to an outside of the box-shaped housing through the single prism unit, the through hole and the optical fiber connector,
wherein the optical receiving module and the optical emitting module are located on both sides of an imaginary extension line passing through the optical fiber connector, the through hole, and the single prism unit in sequence,
wherein a first axial direction of the optical receiving module and a second axial direction of the optical emitting module intersect with the imaginary extension line at a point of the single prism unit,
wherein a first acute angle is between the first axial direction and the imaginary extension line, a second acute angle is between the second axial direction and the imaginary extension line, and the first acute angle and the second acute angle are adjacent angles.

2. The box-type packaged optical transceiver of claim 1, wherein the first acute angle and the second acute angle are in a range of 1-15 degrees.

3. The box-type packaged optical transceiver of claim 1, wherein the single prism unit deflects the first optical signal, the first optical signal is deflected and transmitted to the optical receiving module in a first direction, and the first direction intersects an imaginary extension line formed by the optical fiber connector and the through hole.

4. The box-type packaged optical transceiver of claim 3, wherein the optical emitting module emits the second optical signal in a second direction, and the second direction intersects with the imaginary extension line formed by the optical fiber connector and the through hole.

5. The box-type packaged optical transceiver of claim 4, wherein the single prism unit deflects the second optical signal, and the second optical signal is deflected and transmitted directly to the optical fiber connector.

6. The box-type packaged optical transceiver of claim 1, wherein the first acute angle and the second acute angle are the same.

7. The box-type packaged optical transceiver of claim 1, wherein the optical emitting module comprises a laser module and an optical multiplexer, and the optical receiving module comprises an optical demultiplexer and an optical detection module.

8. The box-type packaged optical transceiver of claim 7, wherein the laser module comprises a plurality of laser diodes, and the optical detection module comprises a plurality of optical detectors.

9. The box-type packaged optical transceiver of claim 8, wherein the first optical signal comprises two wavelengths of 1311 nm and 1331 nm, and the second optical signal comprises two wavelengths of 1271 nm and 1291 nm.

10. A box-type packaged optical transceiver comprising:
a box-shaped housing having a through hole;
a cover plate coupled with the box-shaped housing, and forming an internal space with the box-shaped housing;
an optical receiving module disposed in the internal space;
an optical emitting module disposed in the internal space;
a single prism unit disposed in the internal space;
an optical fiber connector connected to the through hole; and
an electrical connection element passes through the box-shaped housing and electrically connected to the optical receiving module and the optical emitting module,
wherein a first optical signal is transmitted to the optical receiving module through the single prism unit, the optical emitting module emits a second optical signal to an outside of the box-shaped housing through the single prism unit, and the optical receiving module and the optical emitting module are located on both sides of an imaginary extension line formed by the single prism unit and the through hole,
wherein the single prism unit deflects the first optical signal, the first optical signal is deflected and transmitted to the optical receiving module in a first direction, the optical emitting module emits the second optical signal in a second direction, and the first direction and the second direction intersect with the imaginary extension line at a point of the single prism unit,
wherein a first acute angle is between the first direction and the imaginary extension line, a second acute angle is between the second direction and the imaginary extension line, and the first acute angle and the second acute angle are adjacent angles.

11. The box-type packaged optical transceiver of claim 10, wherein the first acute angle and the second acute angle are in a range of 1-15 degrees.

12. The box-type packaged optical transceiver of claim 10, wherein the first acute angle and the second acute angle are the same.

13. The box-type packaged optical transceiver of claim 10, wherein the single prism unit deflects the second optical signal, and the second optical signal is deflected and transmitted directly to the optical fiber connector.

14. The box-type packaged optical transceiver of claim 10, wherein the optical emitting module comprises a laser module and an optical multiplexer, and the optical receiving module comprises an optical demultiplexer and an optical detection module.

15. The box-type packaged optical transceiver of claim 14, wherein the laser module comprises a plurality of laser diodes, and the optical detection module comprises a plurality of optical detectors.

16. The box-type packaged optical transceiver of claim 15, wherein the first optical signal comprises two wavelengths of 1311 nm and 1331 nm, and the second optical signal comprises two wavelengths of 1271 nm and 1291 nm.

\* \* \* \* \*